H. P. SNYDER.
APPARATUS FOR DISTILLING WATER.
APPLICATION FILED FEB. 18, 1908.
916,798.
Patented Mar. 30, 1909.
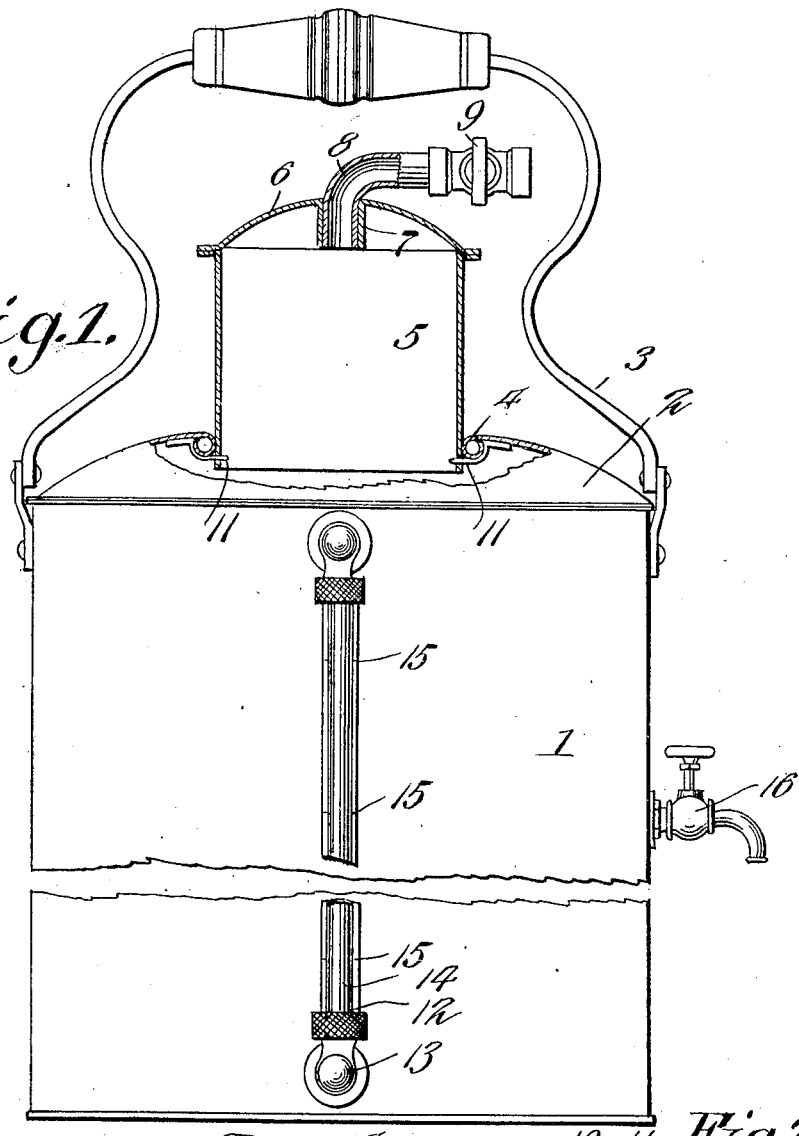
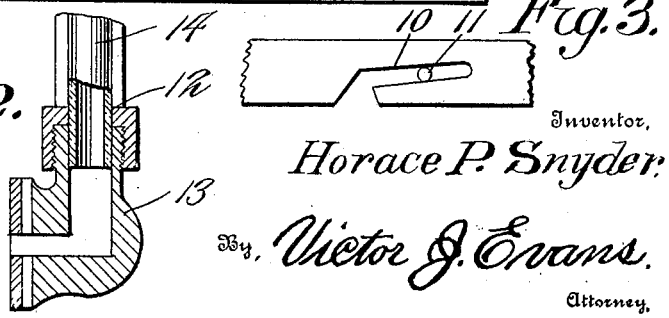
Witnesses:-
Joe P. Wahler.
K. Allen.
Inventor,
Horace P. Snyder.
By, Victor J. Evans.
Attorney.

UNITED STATES PATENT OFFICE.

HORACE P. SNYDER, OF GRAND RAPIDS, MICHIGAN.

APPARATUS FOR DISTILLING WATER.

No. 916,798.  Specification of Letters Patent.  Patented March 30, 1909.

Application filed February 18, 1908. Serial No. 416,489.

*To all whom it may concern:*

Be it known that I, HORACE P. SNYDER, a citizen of the United States, residing at Grand Rapids, in the county of Kent and State of Michigan, have invented new and useful Improvements in Apparatus for Distilling Water, of which the following is a specification.

The invention relates to an improvement in apparatus for distilling water, being particularly directed to a portable distilling boiler which is particularly adapted for efficient and speedy action.

The main object of the present invention is the provision of a distilling boiler including a water receptacle and a steam dome, the latter being removably connected to the receptacle to provide access to the interior of the latter for cleansing or the like.

The invention will be described in the following specification, reference being had particularly to the accompanying drawings, in which:—

Figure 1 is a view in elevation partly in section of my improved apparatus. Fig. 2 is a broken sectional detail of the connection of the gage tube. Fig. 3 is a broken elevation showing the connection of the dome with the receptacle.

Referring particularly to the drawings, my improved distilling apparatus includes a water receptacle 1, preferably of cylindrical form having the usual removable cover 2 and bail 3. The material of which this receptacle is constructed is not important so far as the present invention is concerned, nor is there any specific requirements as to size other than such as may be controlled by the particular uses for which the apparatus is designed. The receptacle 1 is thus of the ordinary domestic boiler type, being readily and conveniently portable by means of the handle 3. The cover 2 of the receptacle is formed with a central opening 4, the edge of which is rolled as shown to provide a rounded edge. Secured within the opening 4 is a dome 5, preferably of cylindrical form corresponding in exterior diameter to the diameter of the opening 4, as shown. The bottom of the dome is open to provide free communication with the interior of the receptacle, the upper end of the dome being closed by a cover 6 having a central depressed flange 7 encircling an outlet through the cover, which flange is designed to receive and support a steam pipe 8, which may be if preferred controlled by a valve 9. The dome 5 is secured to the cover 2 of the receptacle by forming the wall of the dome adjacent its lower edge with diametrically opposed bayonet slots 10 to be engaged by pins 11 projecting from the rounded edge of the opening 4, thus providing a secure and steam tight juncture between the dome and receptacle.

The receptacle is provided with a gage tube 12 in open communication with the interior of the receptacle through the medium of couplings 13 and preferably incased in a metallic tube 14 except for a narrow longitudinal portion to permit inspection of the interior of the tube. The receptacle 1 is also graduated by a series of transversely alined indicating marks 15, whereby to control accurately the amount of water initially put into the apparatus. A manually controlled outlet preferably in the form of a faucet 16 is connected to the receptacle to permit the drawing off of the heated water from the receptacle if such should prove desirable.

In the use of the apparatus the water admitted to the receptacle is converted into steam by the application of heat in any desired manner and the vapor collected and condensed within the supply pipe.

The construction provides a simple form of distilling apparatus which is conveniently portable and which will enable the user to obtain pure water without the need of other special apparatus and in a manner requiring little or no experience or expert manipulation.

Having thus described the invention what is claimed as new, is:—

A distilling apparatus including a portable receptacle, a bail handle for the receptacle, a removable cover for the receptacle, said cover being formed with a central opening having its edges rolled to form a bead, a steam dome of uniform diameter throughout its length and open at bottom, the exterior diameter of said dome corresponding to the interior diameter of the opening, dome engaging means carried by the inner surface of the receptacle cover to underlie the bead and project within the plane of the opening, said dome being formed to coöperate with the cover carried means to secure the dome in position, the cover of the dome being formed with an opening, an annular flange depending from the inner surface of the dome cover in alinement with the edge opening, and a valved outlet pipe having its relatively lower end arranged to be frictionally held within the flange, said pipe above the dome being extended laterally and terminating beyond the edge wall of the dome, the maximum longitudinal and transverse dimension of the dome and outlet pipe being less than the similar dimensions of the bail handle, whereby the latter may be freely swung into operative position above the outlet pipe.

In testimony whereof I affix my signature in presence of two witneses.

HORACE P. SNYDER.

Witnesses:
 CHARLES A. WATT,
 J. A. BOSSFORD.